United States Patent [19]

Peponides

[11] Patent Number: 5,790,941
[45] Date of Patent: Aug. 4, 1998

[54] METHOD AND APPARATUS FOR REGENERATING THE SYMBOL CLOCK OF A CELLULAR TELEPHONE FOLLOWING A SLEEP CYCLE

[75] Inventor: George M. Peponides, Encinitas, Calif.

[73] Assignee: Pacific Communication Sciences, Inc.

[21] Appl. No.: 419,175

[22] Filed: Apr. 10, 1995

Related U.S. Application Data

[63] Continuation-in-part of Ser. No. 84,899, Jun. 29, 1993, Pat. No. 5,406,613.
[51] Int. Cl.⁶ .................................................. H04Q 7/32
[52] U.S. Cl. .................................... 455/87; 455/343
[58] Field of Search ............................... 455/343, 422, 455/87, 86, 85, 84

[56] References Cited

U.S. PATENT DOCUMENTS

5,406,613  4/1995  Peponides et al. ............... 455/343

*Primary Examiner*—William Cumming
*Attorney, Agent, or Firm*—Michael P. Dunnam; J. P. Violette

[57] ABSTRACT

A method for reducing power consumption in a cellular telephone by placing the receiver in a sleep mode when it is determined that the received signal has a sufficiently high quality. The duration of the sleep mode is extended by eliminating the need to resynchronize the receiver clock to the transmitter clock using dotting sequence and synchronizing data in the transmitted control data received after a sleep cycle. This is accomplished by resynchronizing the phase of the symbol clock to the phase of the transmitter clock after a sleep cycle utilizing the respective phase relationships to a low frequency, low power maintenance clock in the receiver which maintains time (and hence edge information) during the sleep mode until reception of the next data frame must begin. The maintenance clock is preferably an off-the-shelf oscillator of the type used in wrist watches. At a specified tick of this clock, which is known to the receiver before it goes to sleep, the high-speed system clocks are turned on in preparation for reception of the next frame of data. Since the phase relationship of the symbol clock to the maintenance clock prior to the sleep mode was known, the phase of the symbol clock is readily recreated after the sleep cycle from the known phase of the maintenance clock, which is never turned off.

18 Claims, 5 Drawing Sheets

METHOD AND APPARATUS FOR REGENERATING THE SYMBOL CLOCK OF A CELLULAR TELEPHONE FOLLOWING A SLEEP CYCLE

CROSS-REFERENCE TO RELATED APPLICATIONS

This application is a continuation-in-part application of U.S. patent application Ser. No. 08/084,899, filed Jun. 29, 1993, now U.S. Pat. No. 5,406,613, issued Apr. 11, 1995.

FIELD OF THE INVENTION

The present invention relates generally to radiofrequency (RF) communications and receivers therefor, and more particularly, to cellular, or mobile, radiotelephones (referred to hereinbelow as cellular telephones). Still more particularly, the present invention relates to methods and apparatus for regenerating a cellular telephone's symbol clock following a sleep cycle which has been implemented to reduce standby power consumption in analog or dual mode cellular telephones employing the AMPS communications standard.

BACKGROUND OF THE INVENTION

Figure 1:
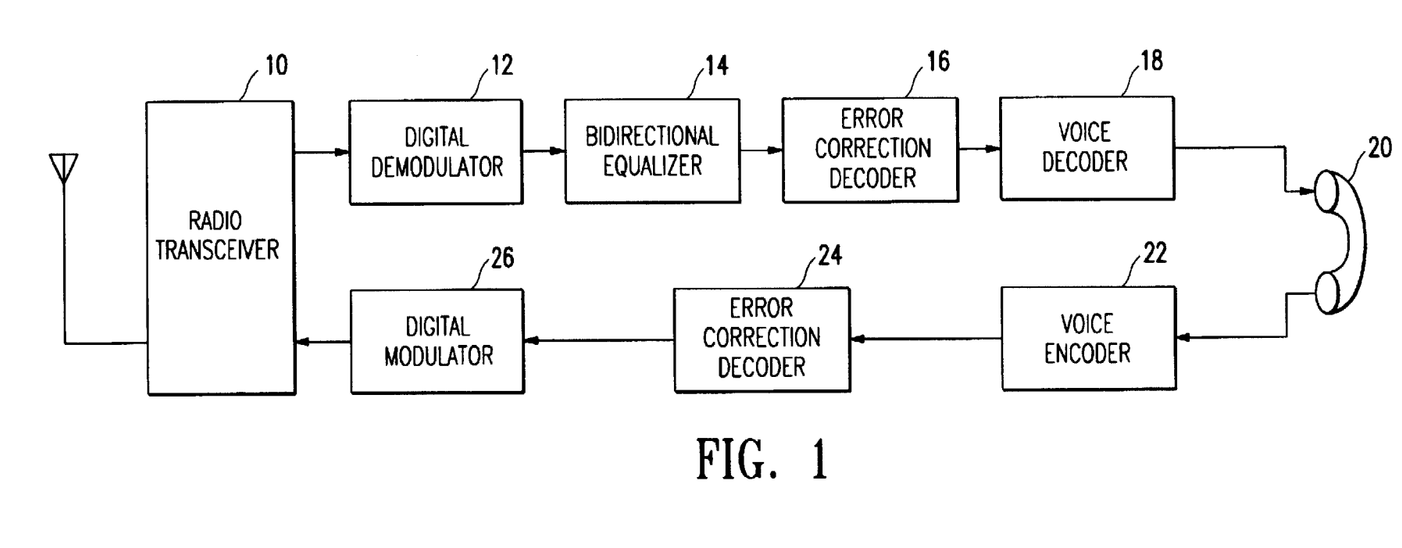
FIG. 1 is a generalized block diagram of a cellular telephone.

FIG. 1 is a generalized block diagram of a cellular telephone which may be modified to include the apparatus of the invention. The illustrated cellular telephone includes a radio transceiver 10, a demodulator 12, an error correction decoder 16, and a voice decoder 18, which are all coupled to the speaker portion of a handset 20. (FIG. 1 also depicts a bidirectional equalizer 14 that is not relevant to the present invention.) The system further comprises, coupled to the microphone portion of the handset 20, a voice encoder 22, error correction encoder 24 and modulator 26.

The cellular telephone illustrated in FIG. 1 operates in the environment of a cellular system typically including many cell sites and a centrally-located cellular switch, called a Mobile Telephone Switching Office (MTSO). Cell sites are usually spaced at distances of one-half to twenty miles and comprise one or more antennas mounted on a triangular platform placed on a tower or atop a tall building. The fundamental idea behind a cellular system is frequency reuse. This concept of frequency reuse is implemented by employing a pattern of overlapping cells, with each cell conceptually viewed as a hexagon. Frequency reuse allows the cellular system to employ a limited number of radio channels to serve many users. For example, a given geographic area may be served by N cells, divided into two clusters. Each cluster would contain N/2 cells. A separate set of channels would be assigned to each cell in a cluster. However, the sets used in one cluster would be reassigned in the other cluster, thus reusing the available spectrum. The signals radiated from a cell in channels assigned to that cell would be powerful enough to provide a usable signal to a mobile cellular telephone within that cell, but preferably not powerful enough to interfere with co-channel signals in distant cells. All cellular telephones within the system would preferably be capable of tuning to any of the channels.

The Federal Communications Commission (FCC) has allocated a 25 MHz spectrum for use by cellular systems. This spectrum is divided into two 12.5 MHz bands, one of which is available to wire line common carriers only and the other of which is available to non-wire line common carriers only. In any given system, the non-wire line service provider operates within the "A side" of the spectrum and the wire line provider operates within the "B side" of the spectrum. Cellular channels are 30 KHz wide and include control channels and voice channels. Each cell site (or, where a cell site is sectored, each sector of that cell site) uses only a single control channel. The control channel from a cell site to a mobile unit is called the "forward" control channel and the control channel from the cellular telephone to the cell site is called the "reverse" control channel. Signals are continuously broadcast over a forward control channel by each cell site.

When a cellular telephone is first turned on, it scans all forward control channels, listening for the channel with the strongest signal. The telephone then selects the forward control channel with the strongest signal and listens for system overhead messages that are broadcast periodically, for example, every 0.8 seconds. These overhead messages contain information regarding the access parameters to the cellular system. The overhead messages also contain busy/idle bits that provide information about the current availability of the reverse control channel for that cell. When the reverse control channel becomes free, as indicated by the busy/idle bits, the cellular telephone attempts to register itself with the system by seizing the reverse control channel.

Figure 2:
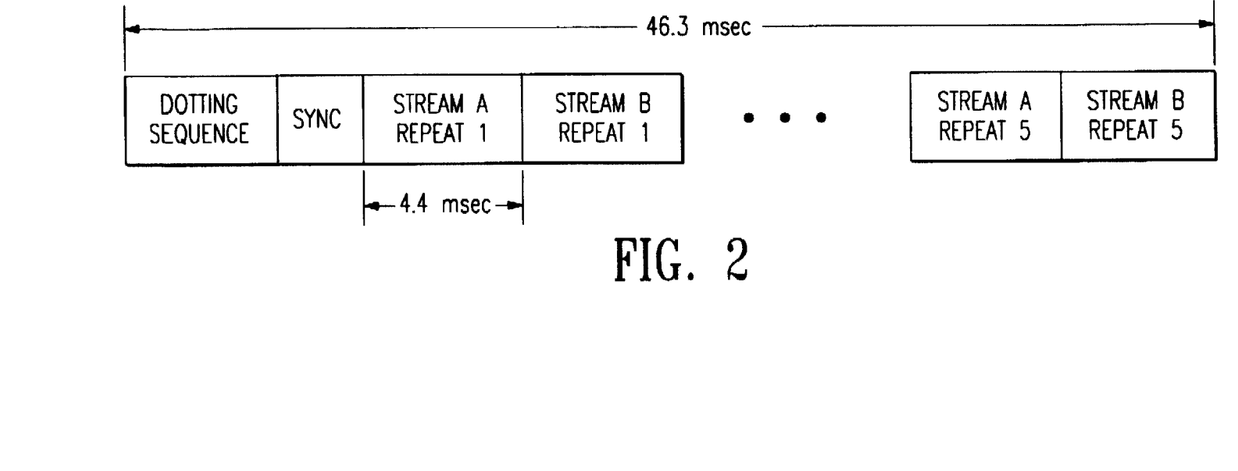
FIG. 2 illustrates the format of a data stream (one frame) received from a cell site.

Cellular telephones, while in an idle or standby mode, must constantly monitor a continuous stream of data messages sent by a cell site over a forward control channel. The format of these messages is depicted in FIG. 2 and is explained in more detail in the Electronic Industries Association (EIA) 553 Cellular System specification. Typically, the cellular telephone uses a dotting sequence, the first segment of the message, to synchronize the cellular telephone hardware to a clock of the data message. A synchronization word (sync) indicates that the data sequence is about to start. However, due to the unreliable nature of a typical terrestrial propagation channel, messages from a cell site are typically repeated multiple times to assure receipt.

In many conventional systems, repeat streams A and B include forty-bit words (which are defined in EIA 553), each word being repeated five times in the message. Each data word is approximately 4.4 msec "long" and an entire message (or frame), including the dotting sequence, sync word, and streams A, B, is approximately 46.3 msec long (FIG. 2). The cellular telephone receives both of the data streams A, B but processes only one of them, where the least significant digit of the unit's telephone number determines which one the data streams is processed. If the telephone number is even, stream A is processed; otherwise stream B is processed. However, to receive and process these data streams, the telephone's receiver must be on and drawing power the entire time, thereby reducing the time the unit can be used.

Techniques for reducing standby power consumption in redundant transmission systems have been devised which cause the receiver to enter a "sleep" mode when no usable information may be received. For example, U.S. Pat. No. 5,175,874, issued Dec. 29, 1992, discloses a process for reducing power consumption in a cellular telephone by receiving, digitizing (i.e., quantizing to binary form), and storing a first data word. An error code in the data word is then checked to determine whether errors exist in the word. If there are errors, the digital word is corrected. A second data word is then received, digitized, checked for errors, and, error corrected if necessary. The second digital word is then compared with the first. If the words are not the same, the receiver remains on until at least two words are identical or the entire five-word message is received, whichever occurs first. If two received words are equal, the message is processed and the receiver is turned off during the remaining portion of the message, until the next synchronization word is received.

Thus, in the process disclosed in the above-cited patent, a minimum of two message words must be received, converted to binary form, error corrected, and compared to one another to determine whether they are identical. This process is therefore limited to systems that encode the message data with an error correction code. In addition, it is believed that the disclosed process provides an unacceptably high average number of words received (note that a minimum of two words must be received) and unacceptably high probabilities of miss and false acceptance.

The power saving technique described herein further exploits the fact that, in an AMPS control channel, multiple copies of a given word are transmitted by the base station, and that, with appropriate processing, the portable cellular telephone unit need only receive as many copies of those words as necessary for reliable reception of the word. In addition, the present inventor has found that further energy savings may be achieved by eliminating the requirement for receiving the dotting sequence and synchronization fields for synchronizing the receiver clock to the transmitter clock after a sleep cycle.

Typically, the dotting sequence and synchronization fields must be received by the receiver so that it can synchronize its clock to the transmitter clock after a sleep cycle. Unfortunately, this requirement adds to the time that the portable cellular telephone unit needs to be actively receiving, with the corresponding reduction in energy savings and in standby time for a given energy source. This reduction is especially serious if the user is designated to receive the B stream of the control channel, for the first B word follows the first A word, which, in turn, follows the sync word (FIG. 2). As a result, the B stream receiver will be active for considerably longer than an A stream receiver and will experience less standby time. This inconsistent behavior between A and B users is generally undesirable. In addition, by turning off the high frequency clocks of the receiver, including the "symbol clock," in order to conserve energy during the sleep cycle, the receiver is effectively discarding useful information regarding the incoming signal bit timing. As a result, the receiver has to re-derive this information from a single occurrence of the dotting and sync words, which is generally less reliable than deriving a long-term estimate of this parameter from reception over multiple frames. This is especially true for a mobile communications system where fades are common and can be so detrimental to the received signal that the correct synchronization may not be achieved.

An improved technique and associated apparatus is thus desired which will limit the receiver operation to receiving only as many copies of those words as necessary for reliable reception of the word and will eliminate the requirement for receiving the dotting sequence and synchronization fields for synchronizing the receiver clock to the transmitter clock after every sleep cycle.

SUMMARY OF THE INVENTION

Accordingly, a primary goal of the present invention is to provide improved methods and apparatus for reducing power consumption in a cellular telephone or like receiving device that receives multiple copies of a message. Pursuant to this goal, the present invention provides methods for reducing power consumption in a receiving device operating in an environment wherein multiple copies of a message block are transmitted for reception by the receiving device. Techniques are described for placing a portable cellular telephone device in a "sleep" mode when the received signal is of a predetermined quality, as determined by comparison of different signal parameters to a plurality of thresholds. The present invention is further characterized by a technique for regenerating the symbol clock of the receiving device after the completion of such a sleep cycle without requiring the receiver to wait for receipt of the dotting sequence and sync words in the next data frame.

In particular, a portable cellular telephone in accordance with the invention is placed in a sleep mode once it has been determined that the received message is of sufficiently reliable quality. When the device is placed in the sleep mode, numerous receiver components such as all high frequency clocks, including the receiver's symbol clock, are turned off. As known to those skilled in the art, the phase of the symbol clock (i.e., the precise point in time that, for example, its falling edge occurs) defines the "decision point" for the received data. Hence, it is important for the phase of the symbol clock to be resynchronized to the phase of the transmitter clock after a sleep cycle. As noted above, this is traditionally done using dotting sequence and sync information in the received data. However, this causes a reduction in the sleep time and in the reliability of the reception.

Accordingly, the present invention utilizes a low frequency, low power, and low cost oscillator in the receiver device to maintain time during the sleep cycle until reception of the next data frame must begin. In a preferred embodiment, the low frequency oscillator is an off-the-shelf oscillator having a 32.768 KHz crystal frequency and is of the type used in wrist watches. At a specified tick of this "maintenance" clock, which is known to the receiver before it goes to sleep, the high-speed system clocks are turned on in preparation for reception of the next frame of data. In other words, the receiver is awakened at a particular edge of the maintenance clock, not the symbol clock. However, if no special allowances are made, the phase of the symbol clock, which determines the decision point, will bear no relationship to the decision point of the incoming signal, and the receiver will have to resynchronize afresh by receiving the dotting and sync words at the beginning of the next data frame.

As a result, the present inventor has further developed a technique in which the phase of the symbol clock may be recreated from the maintenance clock phase and other information that the receiver establishes prior to turning off all of the system clocks and going to sleep. In short, while the "Stop Clocks" command is synchronized to the symbol clock frequency, the "Wake-up" command is synchronized to a low frequency, low power maintenance clock in the receiver which stays on at all times. The phase of the receiver's symbol clock is then regenerated from the phase of the maintenance clock as follows.

First, the time interval D from the last symbol clock tick before going to sleep to the next following maintenance clock tick is measured. This measurement may be simply achieved using an interval counter-timer that counts the number of periods of another clock (with sufficiently high frequency) between the two clock ticks. This time interval is then stored in a memory location for later use in calculating the phase of the restarted symbol clock. Next, another counter that runs off of the maintenance clock is programmed to generate a wake-up signal to the receiver after N ticks of the maintenance clock. Finally, the phase that the symbol clock should have relative to the phase of the maintenance clock is computed immediately following the wake-up signal. This computation is performed using the following set of equations:

$d = M*(T_{mc}) - T_{sc} + D_i(T_{sc} > T_{mc});$  Equation (1a)

$d = T_{mc} - M*(T_{sc}) + D_i(T_{mc} > T_{sc});$  Equation (1b)

$T_s = (N-1)*T_{mc} + d;$ and  Equation (2)

$\Delta T = T_{sc} - \text{mod}(T_s, T_{sc})$  Equation (3)

where:
- d is the interval from the symbol clock at which the "Stop Clocks" command is given to the following maintenance clock tick;
- $T_{sc}$ is the period of the symbol clock;
- $T_{mc}$ is the period of the maintenance clock;
- D is the time interval from the last symbol clock tick before the "Stop Clocks" command is given to the next following maintenance clock tick;
- M is an integer that satisfies $M*T_{mc} \leq T_{sc} \leq (M+1)*T_{mc}$ when $T_{sc} > T_{mc}$ and is the number of the symbol clock ticks from the last maintenance clock tick to the symbol clock tick at which the "Stop Clocks" command is given when $T_{mc} > T_{sc}$;
- $T_s$ is the sleep interval of the receiver;
- N is the number of $T_{mc}$ periods that the receiver sleeps;
- $\Delta T$ is the time interval from the maintenance clock tick at the time of wake-up until the decision point of the received signal, and hence the tick position (phase) that the actual (or virtual) symbol clock should have after being awakened; and
- $\text{mod}(T_s, T_{sc})$ is the remainder of $T_s, T_{sc}$.

Once the estimation of the symbol clock phase upon wake-up is completed, the receiver can receive the desired portion of the data frame (i.e., the first word of the A or B stream) without first having to receive the dotting and sync words. As a result, the receiver may stay asleep longer. This is accomplished at the receiver by either incorporating circuits that force the symbol clock generated following wake-up to have the same phase as the symbol clock before the unit went into sleep mode, or by allowing the actual hardware clock in the receiver to have a different phase (relative to its phase before the receiver went to sleep) each time the receiver wakes up. In the latter case, the phase difference may be compensated through signal processing of the received signal by implementing techniques using, for example, polyphase filters. Both techniques are well known and either technique may be preferred depending upon the receiver architecture. In particular, the first approach would be the preferred embodiment if filtering of the signal is done through continuous time (analog) techniques, whereas the latter approach would be the preferred embodiment if digital signal processing is incorporated in the receiver.

The present invention may advantageously be embodied in a cellular telephone for operation in an environment wherein multiple copies of a message block are transmitted. Such an embodiment preferably comprises a radio transceiver, a demodulator, a control processor for determining whether the reception of the message blocks is sufficiently reliable and putting the receiver into sleep mode when the reception is reliable, a symbol clock which is deactivated in the sleep mode, a low power maintenance clock which is not deactivated in the sleep mode, and sleep control logic which regenerates the symbol clock's phase from the maintenance clock phase and other information that the radio transceiver establishes prior to deactivating all of the system clocks and going to sleep. Further characteristics of such a device will be described herein.

BRIEF DESCRIPTION OF THE DRAWINGS

The present invention will be better understood after reading the following detailed description of the presently preferred embodiments thereof with reference to the appended drawings, in which.

DETAILED DESCRIPTION OF PREFERRED EMBODIMENTS

A system and method which meets the above-mentioned objects and provides other beneficial features in accordance with the presently preferred exemplary embodiment of the invention will be described below with reference to FIGS. 3–6. Those skilled in the art will readily appreciate that the description given herein with respect to those figures is for explanatory purposes only and is not intended in any way to limit the scope of the invention. All questions regarding the scope of the invention should be resolved by referring to the appended claims.

Figure 3:
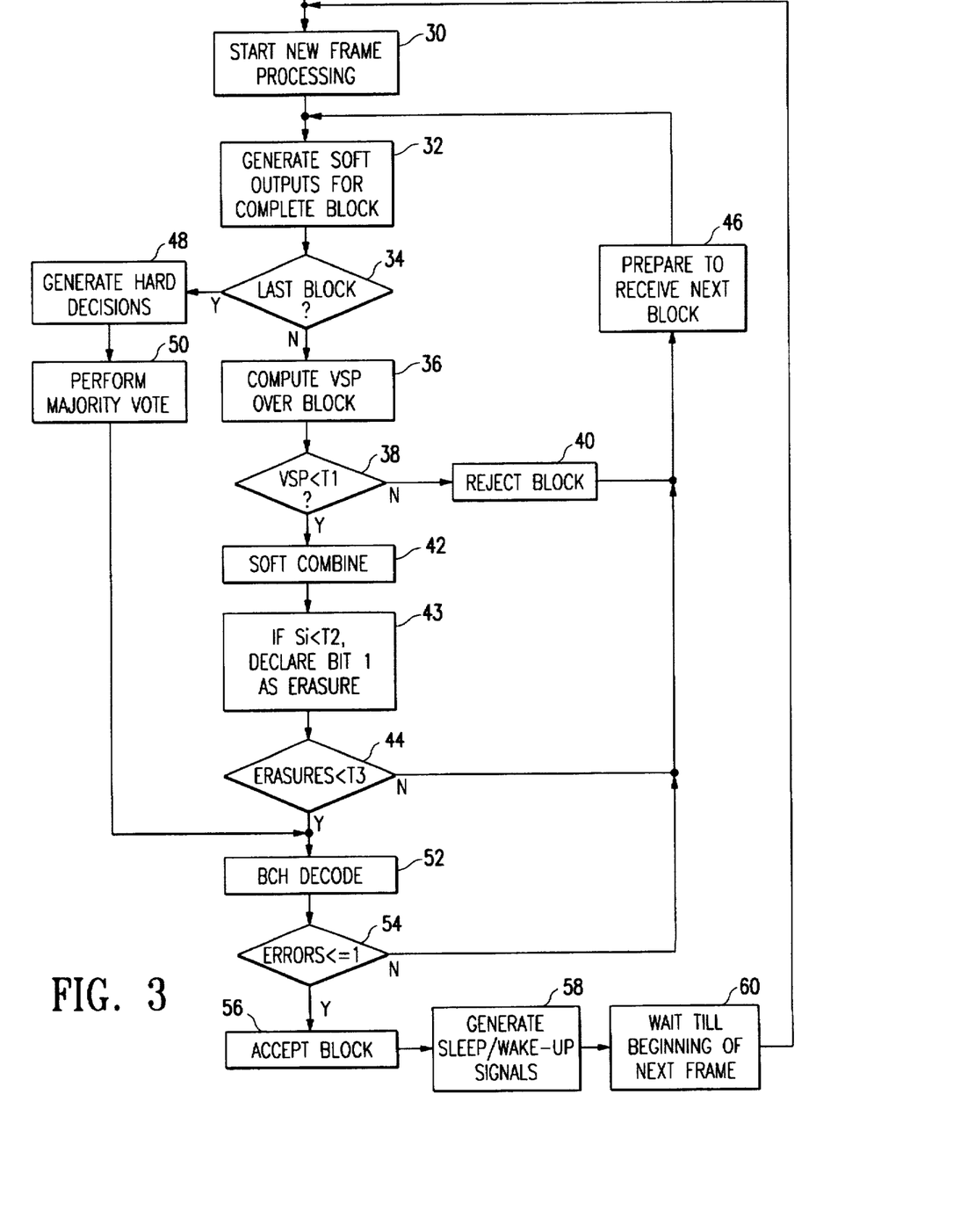
FIG. 3 is a flow chart of a technique for reducing power consumption in a cellular telephone by generating sleep signals when the received signal is of a predetermined quality.

The present invention may best be described in connection with a method for operating a receiving device such as a cellular telephone of the kind discussed above with reference to FIG. 1. Accordingly, an embodiment of a first power saving technique in accordance with the invention is depicted in FIG. 3 as a flow chart representative of software or firmware controlling a cellular telephone. The physical software is not in itself depicted in the drawings. An embodiment of a second power saving technique permits regeneration of the phase of the receiver's symbol clock without receiving the dotting sequence or sync signal will then be described with respect to FIGS. 4–6.

As shown in FIG. 3, a first power saving method of the invention begins by initiating the processing of a new data frame (step 30) by receiving a first copy of a message block. The receiver then generates unquantized, soft output signals representative of all bits in the block (step 32). The soft outputs are generated by sampling the received block at decision points to obtain representations of the individual bits comprising the block. For example, if the data frame contains 463 bits and the block contains forty bits, there preferably would be forty decision points at which a sample of the signal waveform would be obtained. The unquantized (soft) samples would be, in essence, numbers representative of the amplitude of the signal waveform at the respective sampling times (decision points). These numbers would typically be positive and negative voltage values (±V, where V is unquantized).

A determination is then made whether this block is the last block (step 34). If this is not the last block, the receiver computes a block quality metric indicative of the reliability of the block (step 36). The block quality metric in presently preferred embodiments comprises the variance of the signal power (VSP) around decision points of the block. The VSP may be computed by computing, as error values, the differences between respective sample values squared (which represent the power in the sample) and an average power.

For example, the following formula may be employed to compute the VSP:

$$VSP = \frac{1}{N} \sum_{i=0}^{N-1} (V_i - \overline{V})^2$$

$$\overline{V} = \frac{1}{N} \sum_{i=0}^{N-1} V_i$$

$$V_i = S_i^2$$

In the above formula, $S_i$ represents the received signal (sample) at the decision points; $V_i$ represents the received signal power at the decision points; S represents the value of the ideal decision point; and N represents the length of the block in bits (N=40 in the present example). The ideal decision point S represents an ideal voltage sample which would be received in the absence of noise (e.g., plus or minus some constant).

It should be noted that the present invention is by no means restricted to the use of the VSP as a block quality metric. For example, the mean squared error (MSE) could be used instead of the VSP.

The VSP is then compared with a first threshold T1 (step 38). For example, the first threshold in presently preferred embodiments is $3.88*V^2$, where V represents the square of the ideal decision point S. If the VSP is less than the first threshold, the first block is combined with a previously "accepted" (see below) block to obtain a soft combined block (step 42). If the VSP is not less than the first threshold, the block is rejected (step 40) and the process branches to step 46, which is described below.

After the soft combine step, the receiver determines the number of erasures in the block (step 43), the number of erasures being another measure of the quality of the received block. The number of erasures is determined by comparing the signal samples $S_i$ with a second threshold T2 and declaring an erasure if $S_i$ is less than T2. The number of erasures is then compared with a third threshold T3 (step 44). In presently preferred embodiments, the third threshold is 2. If the number of erasures is less than the third threshold, the receiver decodes the soft-combined block (step 52), e.g., employing a BCH decoder (where "BCH" refers to the Bose-Chaudhuri, Hocquenghem error correction coding/decoding technique) and proceeds to step 54. If the number of erasures is not less than the third threshold, the processing branches to step 46.

At step 54, the number of errors is determined and this number is compared with a fourth threshold (e.g., one). The decoded block is accepted (e.g., by storing it in a buffer) if the number of errors is less than or equal to the fourth threshold (step 56). Sleep/wake-up signals are then generated (step 58), and the receiver thereafter waits (step 60) until the next data frame is received. As will be described in more detail below with respect to FIGS. 4–6, the sleep/wake-up signals are timing signals instructing the receiving device to interrupt reception of further copies of the message block until the next data frame begins.

At step 46, the receiver prepares for receiving the next block. This step essentially comprises setting up the receiver hardware (e.g., timers) to receive the next block.

As mentioned above, the number of copies of each message block is predetermined (e.g., five). The receiver thus determines (step 34) whether the copy received is the last copy and, if so, generates hard decision points for the block, i.e., quantizes the individual samples (step 48). The receiver then performs a majority vote with the last block and previously received blocks to construct a hard-combined block (step 50). The generation of a hard-combined block by majority vote is well known.

The technique for generating sleep signals in accordance with the invention is by no means limited to the threshold values specified above in connection with the detailed description. In general, threshold values are determined in the following manner. First, performance criteria are established for the specific application being considered. In the present case, the probability of missing a word and the probability of accepting a word falsely are the selected performance criteria. Ideally, both of these should be made as small as possible. Next, the sensitivity of these performance criteria with respect to each individual threshold is established. Thereafter, the first threshold is established on the basis of the performance criteria being close to where they should be. Then the next threshold is established to move the performance criteria closer to their target values. The process is then repeated with the next threshold, and so on, until the expected performance of the system meets the preestablished performance criteria. Finally, although two criteria were employed in the above example, it should be noted that one criterion may be sufficient in particular applications.

The power saving technique described above exploits the fact that, in an AMPS control channel, multiple copies of a given word are transmitted by the base station, and that, with appropriate processing, the portable cellular receiving device need only receive as many copies of those words as necessary for reliable reception of the word. However, as noted above, further power savings may be achieved by eliminating the requirement to receive the dotting and sync fields for resynchronizing the symbol clock to the transmitter clock. Such a technique will now be described in which the receiver's symbol clock phase is recreated from the phase of a low frequency, low power maintenance clock of the type used in wrist watches, which is used to maintain time at the receiver from the time the high frequency clocks are put in "sleep" mode to the time the high frequency clocks are restarted in preparation for reception of the next frame of data. As will be clear to those skilled in the art, the essence of the technique of the invention is that the symbol clock phase is precisely recreated from the phase of the maintenance clock and other information that the receiver establishes prior to turning off all of the system clocks and going to sleep.

Figure 4:
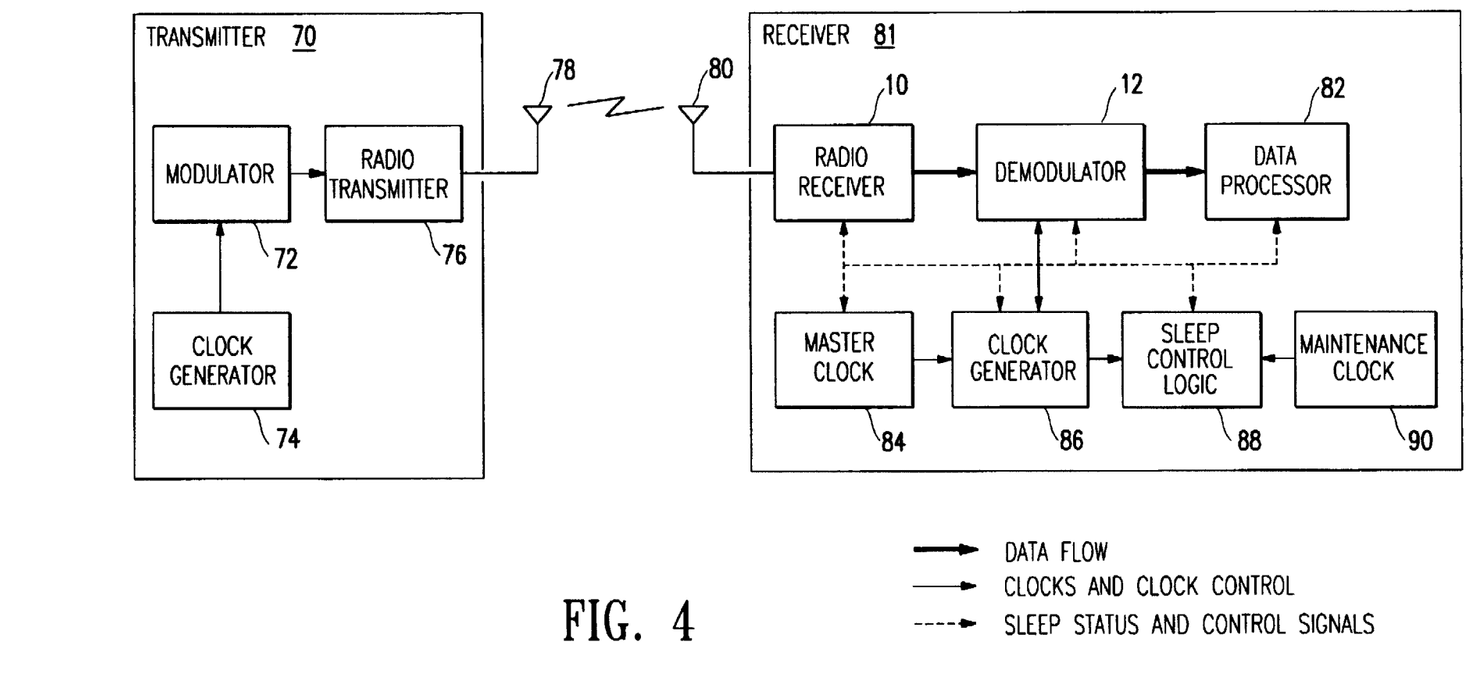
FIG. 4 is a generalized block diagram of a cellular telephone system modified to include the symbol clock regeneration circuitry of the invention.

FIG. 4 illustrates a generalized block diagram of a cellular system having a receiver modified in accordance with the invention so that it is not necessary to receive the dotting sequence and sync signal for regenerating the phase of the receiver's symbol clock. As shown, the cellular base station has a transmitter 70 with a modulator 72 driven by clock generator 74 for providing a control signal to radio transmitter 76, which transmits the control signal at the appropriate AMPS control channel frequency via antenna 78. The control signal is then received at antenna 80 of a portable receiving device 81, such as a portable cellular telephone. As described above with respect to FIG. 1, receiver 81 includes a radio receiver 10 and a demodulator 12. Receiver 81 further includes a data processor 82 for processing the control data from demodulator 12 to determine what action should be taken by the receiver 81.

Those skilled in the art will appreciate that demodulation by demodulator 12 is generally performed at a timing determined by a symbol clock signal derived from a master clock 84 by clock generator 86. Typically, the symbol clock signal is synchronized to the modulation frequency at the transmitter by processing a dotting sequence and sync signal provided in the transmitted data. However, as noted above, such synchronization requires substantial processing overhead at the receiver 81 and shortens the available sleep time for the receiver 81 between control data frames, especially for users assigned to the B data stream.

Accordingly, in the receiver 81 of FIG. 4, a sleep control logic circuit 88 regenerates the frequency and phase of the symbol clock output by symbol clock generator 86, without resynchronization, by adjusting the phase of the symbol clock using the phase of a low frequency, low power maintenance clock 90 which is not turned off during the sleep mode. Preferably, maintenance clock 90 is a low power crystal oscillator of the type used in wrist-watches and is used as a reference for keeping track of the phase of the symbol clock at the beginning of the "sleep" cycle so that the phase of the symbol clock can be regenerated by sleep control logic 88 when the receiver's symbol clock is restarted at the end of the "sleep" cycle.

Figure 5:
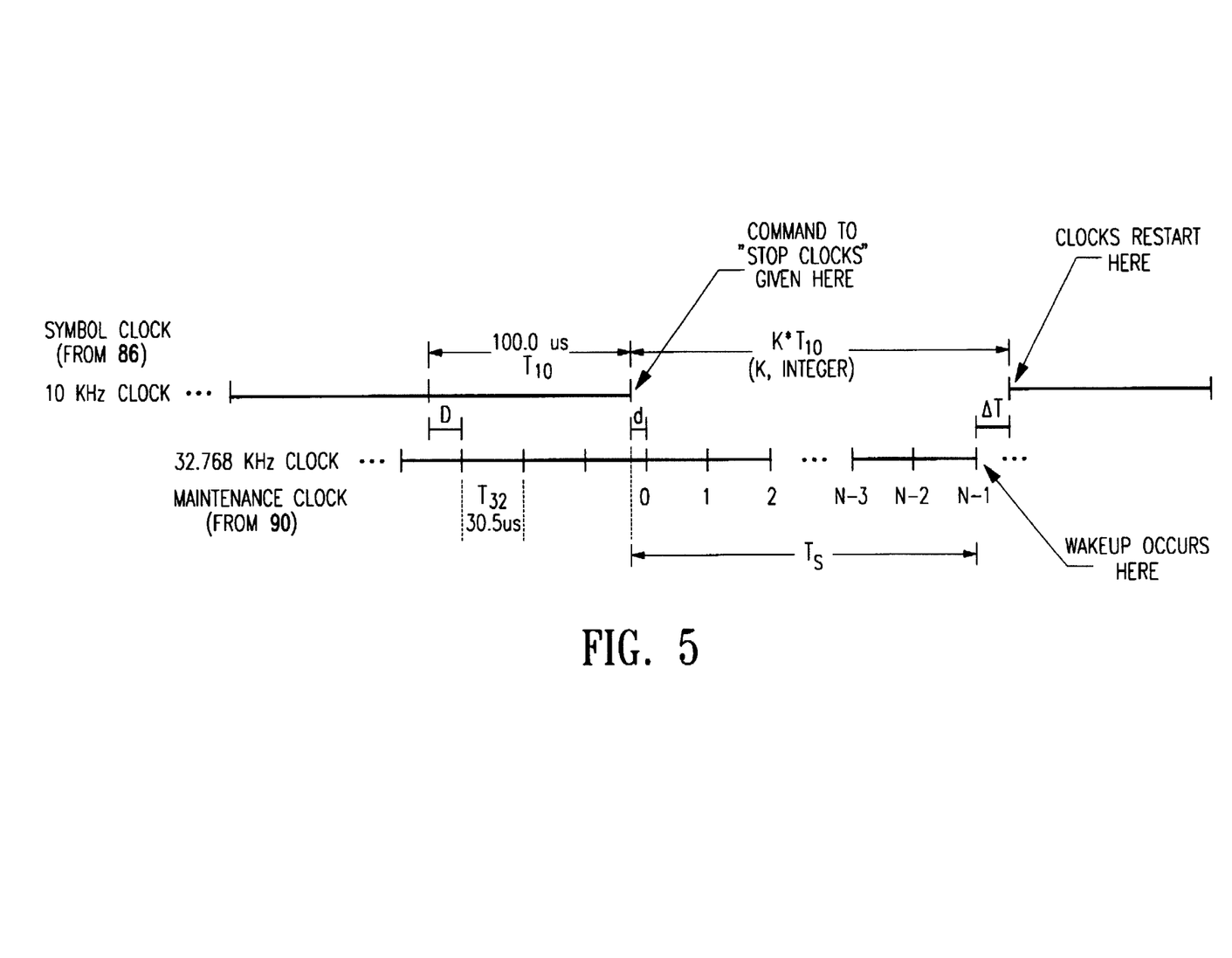
FIG. 5 is a time line indicating how the phase of the symbol clock is recreated from the phase of the maintenance clock in accordance with the invention.
Figure 6:
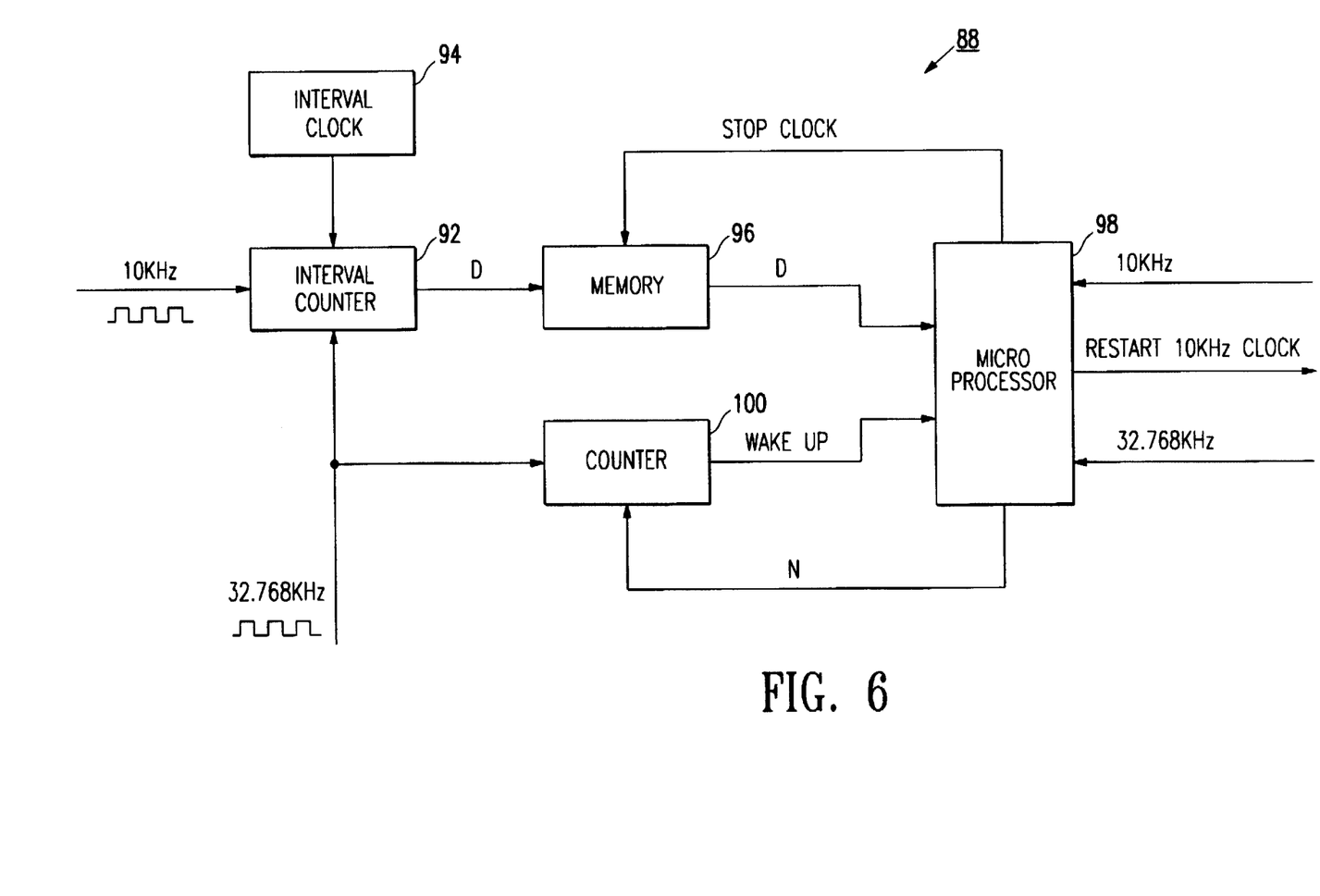
FIG. 6 is a sample embodiment of a sleep control logic circuit in accordance with the invention.

Operation of the sleep control logic 88 will be better understood by referring to FIGS. 5 and 6. As shown in FIG. 5, the maintenance clock (from 90) and the 10 KHz AMPS control channel symbol clock (from 86) typically are not related to each other in a simple harmonic relationship (such as being integer multiples of each other). This is the case because conventional low frequency, low power wrist watch crystals typically have frequencies, such as the presently preferred 32.768 KHz clock frequency, which are not harmonics of the symbol clock frequency. As a result, the phase of symbol clock and the phase of the maintenance clock continuously change relative to each other. Accordingly, sleep control logic 88 estimates the symbol clock phase from the phase of the low power maintenance clock after the receiving device wakes up as well as from information that the receiver 81 collects prior to going to sleep and turning off all the system clocks, including the symbol clock.

As shown in FIGS. 5 and 6, sleep control logic 88 estimates the phase of the symbol clock as follows:

First, the time interval D from the last symbol clock tick before going to sleep to the next following maintenance clock tick is measured. This measurement may be simply achieved using an interval counter-timer 92 that counts the number of periods of an interval clock 94 (with sufficiently high frequency) between the two clock ticks. This time interval D is then stored in a memory 96 upon receipt of the "stop clock" signal from microprocessor 98 and is stored for later use by microprocessor 98 in calculating the phase of the restarted symbol clock. In a preferred embodiment, microprocessor 98 implements the flow chart of FIG. 3 and generates a "stop clock" signal at step 58 as indicated. Next, another counter 100 that runs off of the maintenance clock is programmed by microprocessor 98 to generate a wake-up signal after N ticks of the maintenance clock. Finally, the phase that the symbol clock should have relative to the phase of the maintenance clock is computed by microprocessor 98 immediately following the wake-up signal, and a restart clock signal is output to the symbol clock. This computation is performed using the following set of equations:

$$d = 3*(T_{32}) - T_{10} + D;$$  Equation (1)

$$T_s = (N-1)*T_{32} + d; \text{ and}$$  Equation (2)

$$\Delta T = T_{10} - \text{mod}(T_s, T_{10})$$  Equation (3)

where:

d is the interval from the symbol clock at which the "Stop Clocks" command is given to the following maintenance clock tick;

$T_{10}$ is the period of the 10 KHz symbol clock;

$T_{32}$ is the period of the 32.768 KHz maintenance clock;

D is the time interval from the last symbol clock tick before the "Stop Clocks" command is given to the next following maintenance clock tick;

$T_s$ is the sleep interval of the receiver 81;

N is the number of $T_{32}$ periods that the receiver 81 sleeps;

$\Delta T$ is the time interval from the maintenance clock tick at the time of wake-up until the decision point of the received signal, and hence the tick position (phase) that the actual (or virtual) symbol clock should have after being awakened; and $\text{mod}(T_s, T_{10})$ is the remainder of $T_s/T_{10}$.

In Equation (1), "3" is the integer number of periods $T_{mc}$ of the maintenance clock that fit in the period $T_{sc}$. Generally, this integer, M, satisfies $M*T_{mc} \leq T_{sc} \leq (M+1)*T_{mc}$ when $T_{sc} > T_{mc}$ (as here) and is the number of the symbol clock ticks from the last maintenance clock tick to the symbol clock tick at which the "Stop Clocks" command is given when $T_{mc} > T_{sc}$.

Equations (1)–(3) all follow from FIG. 5. As shown in FIG. 5, the interval $T_{10}$ equals $D+3*T_{32}-d$, which reduces to Equation (1). Equation (2) is illustrated in FIG. 5, where it must be appreciated that wake-up is triggered off of the maintenance clock and not the symbol clock. Equation (3) also follows from FIG. 5 since $\text{mod}(T_s, T_{10}) + \Delta T = T_{10}$. In other words, when the receiver symbol clock 86 is synchronized with the transmitter clock 74, Equation (3) holds because $T_s$ starts at a symbol clock tick ($T_{10}$) and ends at a maintenance clock tick ($T_{32}$) and the regenerated symbol clock tick should be an integer number ($K*T_{10}$) of symbol clock ticks away from the symbol clock tick immediately before the receiver 81 went to sleep (i.e., $K*T_{10} = T_s + \Delta T$).

Once the estimation of the symbol clock phase upon wake-up is completed, the receiver 81 can receive the desired portion of the data frame (i.e., the first word of the A or B stream) without first having to receive the dotting and sync words. As a result, the receiver 81 may stay asleep longer. This is accomplished at the receiver 81 by either incorporating circuits that force the symbol clock generated following wake-up to have the same phase as the symbol clock before the unit went into sleep mode (as described above with respect to the preferred embodiment of FIGS. 4–6), or by allowing the actual hardware clock in the receiver 81 to have a different phase (relative to its phase before the receiver 81 went to sleep) each time the receiver 81 wakes up. In the latter case, the phase difference may be compensated through signal processing of the received signal by implementing techniques using, for example, polyphase filters. Both techniques are well known and either technique may be preferred depending upon the receiver architecture. In particular, the first approach would be the preferred embodiment if filtering of the signal is done through continuous time (analog) techniques, whereas the latter approach would be the preferred embodiment if digital signal processing is incorporated in the receiver 81.

It will be appreciated by those skilled in the art that the foregoing has set forth the presently preferred embodiments of the invention and illustrative embodiments of the invention but that numerous alternative embodiments are possible without departing from the novel teachings of the invention. For example, those skilled in the art will appreciate that the technique of the invention may be used to place the receiver in sleep mode during receipt of the B stream by A stream users, and vice-versa. In addition, those skilled in the art will appreciate that even though the clock regeneration technique was described herein in the context of the AMPS control channel that its applicability is more general. The technique described herein may be applied in all cases where two clocks do not have a simple harmonic relationship to each other, one of the clocks is stopped for some reason but the other is still running, and regeneration of the precise phase of the restarted clock is desired after a certain fixed period of time. Of course, the clock regeneration system described herein need not be limited to use in portable cellular telephones either. In addition, other low power, low frequency off-the-shelf oscillators may be used as desired. All such alternative arrangements are intended to be included within the scope of the appended claims.

I claim:

1. A method for regenerating a receiver clock after a sleep cycle during which said receiver clock was deactivated, said regenerated receiver clock having a predetermined frequency and predetermined phase which has a predetermined relationship to a frequency and phase of a transmitter clock before and after said sleep cycle, comprising the steps of:

measuring a time interval from a last clock tick of said receiver clock before deactivation of said receiver clock to a next following clock tick of a low power maintenance clock which is not deactivated during said sleep cycle;

generating a wake-up signal for said receiver clock at the end of said sleep cycle, said wake-up signal occurring after N clock ticks of said maintenance clock and causing said receiver clock to be restarted; and computing a phase of said restarted receiver clock relative to a phase of said maintenance clock based on the relationship of said maintenance clock to said receiver clock prior to said sleep cycle.

2. The method of claim 1, wherein said computing step comprises the step of calculating a time interval d from the time the receiver clock is stopped at the beginning of said sleep cycle to a next following clock tick of said maintenance clock in accordance with the equations:

$$d = M*(T_{mc}) - T_{rc} + D, \; T_{rc} > T_{mc}, \text{ or}$$

$$d = T_{mc} - M*(T_{rc}) + D, \; T_{mc} > T_{rc},$$

where D is said time interval from said last clock tick of said receiver clock before deactivation of said receiver clock to said next following clock tick of said maintenance clock, $T_{mc}$ is a time interval of a cycle of said maintenance clock, $T_{rc}$ is a time interval of a cycle of said receiver clock, and M is an integer that satisfies $M*T_{mc} \leq T_{rc} \leq (M+1)*T_{mc}$ when $T_{rc} > T_{mc}$ and is the number of the receiver clock ticks from the last maintenance clock tick to the receiver clock tick at which the "Stop Clocks" command is given when $T_{mc} > T_{rc}$.

3. The method of claim 2, wherein said computing step comprises the step of calculating a time interval $\Delta T$ from a maintenance clock tick occurring at the end of said sleep cycle to a tick position that said regenerated receiver clock should have after being awakened and resynchronized to said transmitter clock in accordance with the equation:

$$\Delta T = T_{rc} - \mathrm{mod}(T_s, T_{rc}),$$

where $T_s$ is a time duration of said sleep cycle, $T_s = (N-1)*T_{mc} + d$, and N−1 is a number of $T_{mc}$ periods that said receiver clock sleeps during said sleep cycle.

4. The method of claim 1 wherein said time interval measuring step comprises the steps of counting the number of periods of another clock between said last clock tick of said receiver clock before deactivation of said receiver clock to said next following clock tick of said maintenance clock and storing said time interval in a memory.

5. A receiver circuit for regenerating a receiver clock after a sleep cycle during which said receiver clock was deactivated, said regenerated receiver clock having a predetermined frequency and predetermined phase which has a predetermined relationship to a frequency and phase of a transmitter clock before and after said sleep cycle, comprising:

a low power maintenance clock which is not deactivated during said sleep cycle;

means for measuring a time interval from a last clock tick of said receiver clock before deactivation of said receiver clock to a next following clock tick of said maintenance clock;

means for generating a wake-up signal for said receiver clock at the end of said sleep cycle, said wake-up signal occurring after N clock ticks of said maintenance clock and causing said receiver clock to be restarted; and a processor for computing a phase of said restarted receiver clock relative to a phase of said maintenance clock based on the relationship of said maintenance clock to said receiver clock prior to said sleep cycle.

6. The receiver circuit of claim 5, wherein said processor calculates a time interval d from the time the receiver clock is stopped at the beginning of said sleep cycle to a next following clock tick of said maintenance clock in accordance with the equations:

$$d = M*(T_{mc}) - T_{rc} + D, \; T_{rc} > T_{mc}, \text{ or}$$

$$d = T_{mc} - M*(T_{rc}) + D, \; T_{mc} > T_{rc},$$

where D is said time interval from said last clock tick of said receiver clock before deactivation of said receiver clock to said next following clock tick of said maintenance clock, $T_{mc}$ is a time interval of a cycle of said maintenance clock, $T_{rc}$ is a time interval of a cycle of said receiver clock, and M is an integer that satisfies $M*T_{mc} \leq T_{rc} \leq (M+1)*T_{mc}$ when $T_{rc} > T_{mc}$ and is the number of the receiver clock ticks from the last maintenance clock tick to the receiver clock tick at which the "Stop Clocks" command is given $T_{mc} > T_{rc}$.

7. The receiver circuit of claim 6, wherein said processor calculates a time interval $\Delta T$ from a maintenance clock tick occurring at the end of said sleep cycle to a tick position that said regenerated receiver clock should have after being awakened and resynchronized to said transmitter clock in accordance with the equation:

$$\Delta T = T_{rc} - \mathrm{mod}(T_s, T_{rc}),$$

where $T_s$ is a time duration of said sleep cycle, $T_s = (N-1)*T_{mc} + d$, and N−1 is a number of $T_{mc}$ periods that said receiver clock sleeps during said sleep cycle.

8. The receiver circuit of claim 5, wherein said maintenance clock comprises a low power crystal oscillator of the type used in wrist watches.

9. The receiver circuit of claim 8, wherein said crystal oscillator has a frequency of 32.768 KHz.

10. The receiver circuit of claim 5, wherein said time interval measuring means comprises an interval clock, an interval counter which counts the number of periods of said interval clock between said last clock tick of said receiver clock before deactivation of said receiver clock to said next following clock tick of said maintenance clock, and a memory which stores said time interval.

11. The receiver circuit of claim 5, wherein said wake-up signal generating means comprises a counter which counts N clock ticks of said maintenance clock and outputs said wake-up signal after counting said N clock ticks of said maintenance clock.

12. A cellular telephone for operation in an environment wherein multiple copies of a message block are transmitted by a transmitting device, comprising:

a radio transceiver;

a demodulator;

a symbol clock for driving demodulation by said demodulator;

first means for adaptively determining the reliability of the reception of each copy of a received message block and for ignoring subsequent copies of said received message block and stopping said symbol clock for a sleep time if the reception of said received message block is found to be reliable; and second means, responsive to said first means, for regenerating said symbol clock after said sleep time whereby said regenerated symbol clock has a predetermined frequency and predetermined phase which has a predetermined relationship to a frequency and phase of a transmitter clock before and after said sleep time, said second means comprising a low power maintenance clock which is not deactivated during said sleep time and means, responsive to said maintenance clock, for generating a wake-up signal for said symbol clock after N clock ticks of said maintenance clock.

13. The telephone of claim 12, wherein said second means further comprises a processor for computing a phase of said regenerated symbol clock relative to a phase of said maintenance clock based on the relationship of said maintenance clock to said symbol clock prior to said sleep time.

14. The telephone of claim 13, wherein said processor calculates a time interval d from the time the symbol clock is stopped at the beginning of said sleep time to a next following clock tick of said maintenance clock in accordance with the equations:

$$d=M*(T_{mc})-T_{sc}+D, \ T_{sc}>T_{mc}, \text{ or}$$

$$d=T_{mc}-M*(T_{sc})+D, \ T_{mc}>T_{sc},$$

where D is a time interval from a last clock tick of said symbol clock before deactivation of said symbol clock to a next following clock tick of said maintenance clock, $T_{mc}$ is a time interval of a cycle of said maintenance clock, $T_{sc}$ is a time interval of a cycle of said symbol clock, and M is an integer that satisfies $M*T_{mc} \leq T_{sc} \leq (M+1)*T_{mc}$ when $T_{sc}>T_{mc}$ and is the number of the symbol clock ticks from the last maintenance clock tick to the symbol clock tick at which the "Stop Clocks" command is given $T_{mc}>T_{sc}$.

15. The telephone of claim 14, wherein said processor calculates a time interval ΔT from a maintenance clock tick occurring at the end of said sleep time to a tick position that said regenerated symbol clock should have after being awakened and resynchronized to said transmitter clock in accordance with the equation:

$$\Delta T=T_{sc}-\text{mod}(T_s,T_{sc}),$$

where $T_s$ is said sleep time, $T_s=(N-1)*T_{mc}+d$, and N−1 is a number of $T_{mc}$ periods that said symbol clock sleeps during said sleep time.

16. The telephone of claim 12, wherein said maintenance clock comprises a low power crystal oscillator of the type used in wrist watches.

17. The telephone of claim 16, wherein said crystal oscillator has a frequency of 32.768 KHz.

18. The telephone of claim 12, wherein said wake-up signal generating means comprises a counter which counts N clock ticks of said maintenance clock and outputs said wake-up signal after counting said N clock ticks of said maintenance clock.

* * * * *